Figure 1:
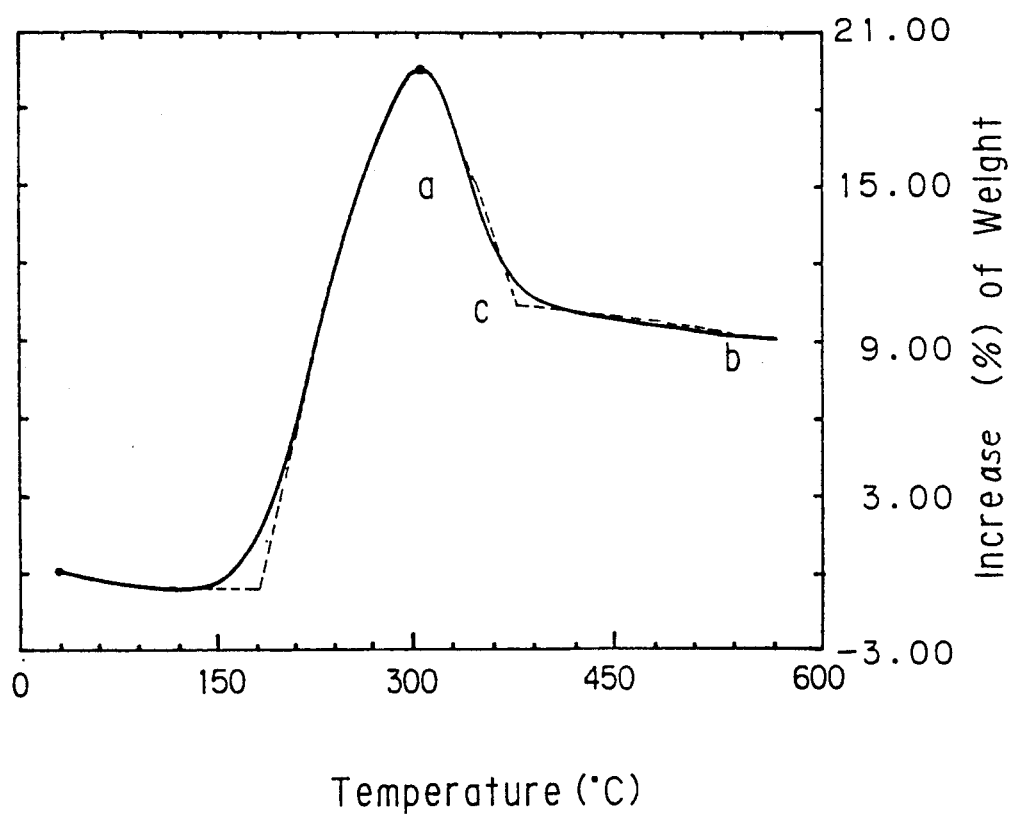

United States Patent [19]

Kitamura et al.

[11] Patent Number: 5,104,561
[45] Date of Patent: Apr. 14, 1992

[54] PROCESS FOR PREPARING CARBIDE FINE PARTICLES

[75] Inventors: Ikuo Kitamura, Kyoto; Yoshiyuki Shibuya, Osaka; Takashi Shibanuma, Kadoma; Shigeo Daimon, Osaka, all of Japan

[73] Assignee: Daikin Industries, Ltd., Osaka, Japan

[21] Appl. No.: 617,294

[22] Filed: Nov. 19, 1990

Related U.S. Application Data

[63] Continuation of Ser. No. 256,804, Oct. 12, 1988, abandoned.

[30] Foreign Application Priority Data

Oct. 13, 1987 [JP]  Japan .................................. 62-258986

[51] Int. Cl.$^5$ ............................................. C01B 31/30
[52] U.S. Cl. .................................. 252/62.51; 423/439
[58] Field of Search ...................... 252/62.51; 423/489

[56] References Cited

U.S. PATENT DOCUMENTS 4,668,414  5/1987  Okamura et al. ................. 252/62.51

FOREIGN PATENT DOCUMENTS 227104  7/1987  European Pat. Off. ......... 252/62.51

*Primary Examiner*—Jack Cooper
*Attorney, Agent, or Firm*—Nikaido, Marmelstein, Murray & Oram

[57] ABSTRACT

Fine iron carbide particles consisting essentially of iron carbide, which are characterized in that, in the step of the variation of the weight under the condition of combustion, the increase of the weight in the equilibrium after arrival at the maximum weight is 22% or less, on the basis of the weight before combustion.

4 Claims, 1 Drawing Sheet

PROCESS FOR PREPARING CARBIDE FINE PARTICLES

This application is a continuation of application Ser. No. 256,804 filed Oct. 12, 1988, now abandoned.

The present invention relates to iron carbide fine paticles and a process for preparing the same.

It is known that acicular particles containing iron carbide are prepared by contacting acicular iron oxyhydroxide or acicular iron oxide with CO or a mixture of CO and $H_2$ at 250° to 400° C. and that the resulting particles have a high coercive force and are useful as a magnetic material for magnetic recording media. (For example, refer to JP-A-60-71509, 60-108309, 60-127212 and 60-155522. The term "JP-A" as used herein means an "unexamined published Japanese patent application".)

However, when the iron carbide particles formed after completion of the carburization reaction are left in air, there is observed a phenomenon that the magnetization decreases with the lapse of time.

The variation of the weight of the iron carbide fine particles during the manufacture step and under the condition of temperature elevation in air could be observed and considered as follows: Iron carbide fine particles are prepared by contacting particles of iron oxyhydroxide, particles of iron oxide or particles of metal iron with a carburizing gas such as carbon monoxide, whereupon all the carbon in the carburizing gas as consumed is not converted into iron carbide but the carbon partly is converted into free carbon. Accordingly, if the particles of iron oxyhydroxide, iron oxide or metal iron are kept in contact with the carburizing gas too long, the carburization of the iron particles become saturated and thereafter only the free carbon deposites around the iron carbide particles formed whereby the magnetic characteristics of the particles rather lower. Accordingly, when the free carbon-deposited iron carbide fine particles are heated at a constant speed with being kept in contact with an atmospheric air, the weight slightly decreases to the minimum weight at a temperature of up to 120° C. or so, and thereafter the weight increases first gradually, then increasingly rapidly and again gradually to the maximum weight at a temperature of up to 300° C. or so. Afterwards, the weight again decreases first gradually, then rapidly, again gradually and finally linearly gradually at a temperature of from 360° C. or so. As a result, the weight has increased as compared with the initial weight, although the weight still decreases at 550° C. or so. The increase of the weight is caused by the substitution of the carbon of the iron carbide by oxygen, and the decrease of the weight is caused by the escape of the carbon from the iron carbide fine particles as being in the form of carbon dioxide. The escaping carbon that causes the decrease of the weight is considered to be mainly the free carbon.

When a carburizing gas (for example, carbon monoxide) is contacted with iron oxyhydroxide to form a desired product $Fe_5C_2$, whereupon the amount of the carbon dioxide to be generated is suppressed to the theoretical amount or up to the theoretical amount plus 10% thereof, it is observed that the increase of the weight at a temperature of 450° C. or so is to be more than 22%.

An object of the present invention is to provide iron carbide fine particles which are excellent in the magnetic characteristic and the corrosion-resistance, that is, the particles whose magnetization hardly lowers, as well as a method for preparing such iron carbide fine particles.

The above and other objects of the invention will become apparent from the following description.

The present invention provides iron carbide fine particles consisting essentially of iron carbide, which are characterized in that, in the step of the variation of the weight under the condition of combustion, the increase of the weight in the equilibrium after arrival at the maximum weight is 22% or less, on the basis of the weight before combustion, and a process for preparing the same.

The iron carbide fine particles of the present invention can be prepared by a method, in which (a) after fine particles of iron oxyhydroxide or iron oxide have been or have not been contacted with a reducing gas containing no carbon atom, (b) the particles are contacted with a carburizing gas or a mixture of a carburizing gas and a reducing gas containing no carbon atom at a temperature between 250° C. and 395° C. to prepare iron carbide fine particles, and (c) the resulting iron carbide fine particles are contacted with a carburizing gas at a temperature higher than the said temperature by 5° to 20° C. for 0.5 to 5 hours.

Examples of preferred iron oxyhydroxide fine particles are ones of α-FeOOH (goethite), β-FeOOH (akaganite) and γ-FeOOH (lepidocrosite). Examples of preferred iron oxide fine particles are ones of α-$Fe_2O_3$ (hematite), γ-$Fe_2O_3$ (maghemite) and $Fe_3O_4$ (magnetite).

α-$Fe_2O_3$ or γ-$Fe_2O_3$ is, for example, any of one prepared by heating α-FeOOH, β-FeOOH or γ-FeOOH at about 200° to about 350° C., followed by dehydration, α-$Fe_2O_3$ or γ-$Fe_2O_3$ prepared by heating the resulting product further at about 350° to about 900° C. to compact the crystals, and others. β-FeOOH is preferably treated with an aqueous solution of alkaline compound.

The above-mentioned $Fe_3O_4$ can be prepared by contacting an iron oxide other than $Fe_3O_4$ or iron oxyhydroxide with a carburizing gas or a reducing gas containing no carbon atom, or a mixture thereof, although the $Fe_3O_4$ is not limited to one prepared in those methods. When a carburizing gas or a mixture thereof with a reducing gas containing no carbon atom, is contacted with an iron oxyhydroxide or iron oxide other than $Fe_3O_4$ to prepare $Fe_3O_4$, the same contact conditions as those in the process (b) of the invention can also be employed except for the time condition. In this case, the $Fe_3O_4$ formed can be subsequently held in contact with the gas under the same conditions as in the preceding reaction without any interruption to obtain the desired particles of the invention.

The starting iron oxyhydroxides or iron oxides can be those usually at least 1, preferably 1 to 20, in average axial ratio and having an average particle size (long axis) of usually up to 2 μm, preferably 0.1 to 2 μm, most preferably 0.1 to 1.0 μm. As will be described later, the particles produced are slightly smaller than, but almost unchanged from, the starting material in average axial ratio and in average particle size, so that the particles of the invention in general preferably have such sizes for magnetic material as already stated.

The starting iron oxyhydroxide or iron oxide may have added thereto a small amount or small amounts of a compound, such as oxide or carbonate of copper, magnesium, manganese, nickel or cobalt, silicon oxide, potassium salt, sodium salt, etc., insofar as the starting material chiefly comprises an iron oxyhydroxide or iron oxide.

The starting iron oxyhydroxide and iron oxide preferably have a pH of at least 5 on the surface thereof, the former being disclosed in JP-A-60-108309. In this case are produced particles having a higher coercive force. The starting iron compounds having a pH of less than 5 can be used after it is increased to at least 5 in pH by contact with an aqueous solution of an alkali compound (e.g., sodium hydroxide, potassium hydroxide, ammonium hydroxide). The starting material can be treated with an alkaline compound by contacting the material with an aqueous solution of sodium hydroxide, potassium hydroxide, ammonium hydroxide and like alkaline compound (e.g., with an aqueous solution having a pH of at least 8, preferably at least 10), stirring for 30 minutes to 1 hour when required, filtering and drying the mixture. In the present invention, the surface pH is defined as a value which is obtained by boiling 5 g of a sample in 100 cc of distilled water for one hour, cooling the solution to room temperature, allowed to stand for one hour and measuring a pH of the resulting supernatant with a pH meter.

The starting iron compound can be used as coated with a sintering-preventing agent as disclosed in JP-A-60-141611. Examples of useful agents are silicone compound, boron compound, aluminum compound, aliphatic carboxylic acid or salt thereof, phosphorus compound, titanium compound, etc.

In the invention, typical examples of the reducing gas containing no carbon atom are $H_2$, $NH_2NH_2$, etc.

As the carburizing gas, at least one of the following compounds can be used.

① CO

② aliphatic, linear or cyclic, saturated or unsaturated hydrocarbons such as methane, propane, butane, cyclohexane, methylcyclohexane, acetylene, ethylene, propylene, butadiene, isoprene, town gas, etc.

③ aromatic hydrocarbons such as benzene, toluene, xylene, alkylated or alkenylated derivatives thereof having a boiling point up to 150° C.

④ aliphatic alcohols such as methanol, ethanol, propanol, cyclohexanol, etc.

⑤ esters such as methyl formate, ethyl acetate and like ester having a boiling point up to 150° C.

⑥ ethers such as lower alkyl ether, vinyl ether and like ether having a boiling point up to 150° C.

⑦ aldehydes such as formaldehyde, acetaldehyde and like aldehyde having a boiling point up to 150° C.

⑧ ketones such as acetone, methyl ethyl ketone, methyl isobutyl ketone and like ketone having a boiling point up to 150° C.

Particularly preferable carburizing gas is CO, $CH_3OH$, $HCOOCH_3$, saturated or unsaturated aliphatic hydrocarbons having 1 to 5 carbon atoms.

In the process (a) of the invention, the reducing gas containing no carbon atom can be used as it is or as diluted. Examples of diluents are $N_2$, $CO_2$, argon, helium, etc. The dilution ratio is suitably selected but is preferably up to about 10 times (by volume). The contacting temperature, contacting time, gas flow rate and other conditions depend, for example, on the production history, average axial ratio, average particle size and specific surface area of the iron compound. The preferred contacting temperature is about 200° to about 700° C., preferably about 300° to about 400° C. The preferred contacting time is about 0.5 to about 6 hours.

The preferred gas flow rate (excluding diluent) is about 1 to about 1000 ml S.T.P./min per gram of the starting iron compound. The contacting pressure inclusive of that of the diluent is usually 1 to 2 atom. although not limitative particularly.

In the process (b) of the invention, the carburizing gas or a mixture thereof with the reducing gas containing no carbon atom can be used as it is or as diluted. When the mixture is used, the mixing ratio of the carburizing gas and the reducing gas containing no carbon atom is suitably selected but is preferably up to 1/5 by volume. Contact conditions are also suitably selected but the preferred contacting temperature is about 250° to about 395° C., more preferably about 300° to about 395° C. The preferred contacting time is about 0.5 to about 6 hours when the contact in (a) is conducted, and about 1 to about 12 hours when the contact in (a) is not conducted. The preferred gas flow rate (excluding diluent) is about 1 to about 1000 ml S.T.P./min per gram of the starting iron compound. The contacting pressure inclusive of that of the diluent is usually 1 to 2 atom. although not limitative particularly.

In accordance with the present invention, the fine iron carbide particles obtained by the above-mentioned process are further brought into contact with a carburizing gas at a temperature higher than the contacting temperature in the said step (b) by 5° to 20° C. for 0.5 to 5 hours. Accordingly, the magnetization may more rapidly be saturated and stablized so that the degree of the decrease of the amount would be small.

The iron carbide fine particles of the present invention are characterized in that, in the step of the variation of the weight under the condition of combustion, the increase of the weight in the equilibrium after arrival at the maximum weight is 22% or less, on the basis of the weight before combustion. The "step of the variation of the weight under the condition of combustion" as referred to herein is defined to be the step of variation of the weight of iron carbide fine particles when 2 to 3 mg of the particles are heated at a temperature-elevating rate of 10° C./min with applying an air thereto at a flow rate of from 200 to 300 ml/min.

One example of the weight variation of iron carbide fine particles when heated in air, is demonstrated by FIG. 1. The graph of FIG. 1 shows the relation between the temperature (°C.) and the weight increase (%), when 2.53 mg of a sample of the particles is heated at a temperature-elevating rate of 10° C./min with applying an air thereto at a flow rate of 250 ml/min, and the weight variation of the thus heated sample was measured by the use of a thermogravimetric measuring apparatus (S S C-5000, Seiko Electronic Industries Co.). As is obvious from FIG. 1, the iron carbide was gradually oxidized, when heated in air, to be converted into iron oxide so that the weight increased, and thereafter the free carbon depositing on the surface of the iron carbide particles was oxidized so that the weight decreased. In the graph, the point c shows the intersecting point of the most sharply sloping tangent line near a and the most gently sloping tangent line near b, and the increase of the weight in the equilibrium after arrival at the maximum weight, on the basis of the weight before combustion, in the step of the variation of the weight under the condition of combustion is represented by the value of the increase of the weight (%) at the point c.

In accordance with the present invention, the above-mentioned weight increase is required to be 22% or less, preferably from 22 to 5% by weight, more preferably from 20 to 10% by weight.

The particles obtained by the present invention are in the form of generally uniform particles when observed under an electron microscope. The particles are present as primary particles and have the same particulate form as the starting particles of iron compound. The particles obtained by the process are found to contain carbon by elementary analysis and to contain an iron carbide by its X-ray diffraction pattern, which exhibits spacings of lattice planes at 2.28 Å, 2.20 Å, 2.08 Å, 2.05 Å and 1.92 Å. Such pattern corresponds to $Fe_5C_2$. The iron carbide component of the present invention chiefly comprises $Fe_5C_2$, with $Fe_2C$, $Fe_{20}C_9$ ($Fe_{2.2}C$), $Fe_3C$, etc. present conjointly therewith in some cases. It is suitable to represent the iron carbide as $Fe_xC$ ($2 \leq X < 3$).

According to the present invention, iron carbide fine particles can be obtained which are excellent in the magnetic characteristics, small in the degree of the decrease of the saturation magnetization ($\sigma s$), and excellent in stability.

The invention will be described below in detail with reference to examples.

In the following examples, characteristics, etc. are determined in the methods described below.

(1) Magnetic characteristics.

Determined in the following method unless otherwise specified.

Coercive force (Hc, Oe), and saturation magnetization ($\sigma s$, e.m.u./g) are measured in a magnetic field with a strength of 10 kOe, using a gauss meter equipped with a Hall-effect element and the sample with a packing ratio of 0.2.

(2) Elementary analysis for carbon

The sample is subjected to elementary analysis in the conventional method using MT2 CHN CORDER Yanaco, Yanagimoto Mfg. Co., Ltd, with passage of oxygen (helium carrier) at 900° C.

(3) Corrosion-resistance

Fine iron carbide particles were put in an atmospheric air at 100° C. for 8 hours, and the variation of $\sigma s$ before and after the treatment was measured. The corrosion-resistance was obtained from the following equation:

$$\text{Corrosion-resistance (\%)} = 100 - \frac{A - B}{A} \times 100$$

A: $\sigma s$ before treatment
B: $\sigma s$ after treatment

FIG. 1 is a graph showing the weight variation of fine iron carbide particles when heated in air.

EXAMPLE 1

Two g of acicular α-iron oxide particles, 0.5 μm in average size (long axis) and 10 in average axial ratio, were placed into a porcelain boat, which was then inserted into a tubular furnace. After replacing the air in the furnace by nitrogen, the particles were heated to 360° C. CO was introduced thereinto at a flow rate of 1000 ml/min at the said temperature so that the particles were kept in contact with the gas until the integrated amount of $CO_2$ in the exhaust gas became 1.14 liters. Afterwards, the temperature was elevated further by 5° C. and the product was further kept in contact with the CO gas until the integrated amount of $CO_2$ in the exhaust gas became 1.25 liters. The particles were thereafter allowed to cool to room temperature to obtain a black acicular fine particles.

The X-ray diffraction pattern of the product matched that of $Fe_5C_2$ Iron Carbide on ASTM X-Ray Powder Data File 20-509. The results were given in Tables 1.

EXAMPLE 2

The same process as in Example 1 was repeated, except that the integrated amount of $CO_2$ in the exhaust gas (1.25 liters in Example 1) was varied to 1.37 liters, to obtain fine iron carbide particles.

EXAMPLE 3

The same process as in Example 1 was repeated, except that the temperature in the reaction system was elevated by 10° C. when the integrated amount of $CO_2$ in the exhaust gas became 1.14 liters and the product was further kept in contact with CO gas until the integrated amount of $CO_2$ in the exhaust gas became 1.37 liters, and fine iron carbide particles were obtained.

COMPARATIVE EXAMPLE 1

The same process as in Example 1 was repeated, except that the process was stopped when the integrated amount of $CO_2$ in the exhaust gas became 1.14 liters, to obtain fine iron carbide particles for comparison.

COMPARATIVE EXAMPLE 2

The same process as in Example 1 was repeated, except that the process was stopped when the integrated amount of $CO_2$ in the exhaust gas became 1.25 liters while the contacting temperature was not varied but was 360° C., and fine iron carbide particles were obtained for comparison.

In Table 1, the reactivity was obtained from the following reaction formula, on the basis of the percentage of $CO_2/\alpha\text{-}Fe_2O_3$ (1.14 liters/2 g) of being 100%.

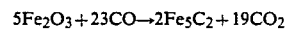

TABLE 1

| | Reactivity (%) | Magnetic characteristics | | Content of total carbon (wt %) | Weight increase (%) | Corrosion resistance (%) |
|---|---|---|---|---|---|---|
| | | Hc | σs | | | |
| Ex. | | | | | | |
| 1 | 110 | 1100 | 94 | 17 | 19 | 10 |
| 2 | 120 | 1070 | 93 | 20 | 15 | 7 |
| 3 | 120 | 1060 | 92 | 22 | 12 | 5 |
| Com. Ex. | | | | | | |
| 1 | 100 | 1080 | 92 | 12 | 26 | 20 |
| 2 | 110 | 1080 | 90 | 15 | 24 | 19 |

We claim:

1. A process for producing iron carbide particles of improved corrosion resistance comprising the steps of:
   a) contacting fine particles of iron oxyhydroxide or iron oxide with a carburizing gas or a mixture of a carburizing gas and a reducing gas containing no carbon atoms, at a temperature of 250° C.–395° C. for 1–12 hours to produce an iron carbide fine particle product; and
   b) thereafter contacting the product of said step (a) with a carburizing gas at a temperature higher than the temperature in step (a) by 5°–20° C., for 0.5–5 hours to produce fine particles consisting essentially of iron carbide which is mainly composed of $Fe_5C_2$, and which exhibit a smaller corrosion resistance (%) than the product of step (a).

2. A process as defined in claim 1 wherein the contact step (a) is conducted at a temperature of 300°-395° C.

3. A process for producing iron carbide particles of improved corrosion resistance comprising of the steps of:
   a) contacting fine particles of iron oxyhydroxide or iron oxide with a reducing gas containing no carbon atoms at a temperature of 200°-700° C. for 0.5-6 hours;
   b) contacting the resulting fine particles with a carburizing gas, or a mixture of a carburizing gas and a reducing gas containing no carbon atoms, at a temperature of 250° C.-395° C. for 0.5 to 6 hours to produce iron carbide fine particles; and
   c) thereafter contacting the iron carbide fine particles with a carburizing gas at a temperature higher than the temperature in step (b) by 5°-20° C., for 0.5-5 hours to produce iron carbide fine particles consisting essentially of iron carbide which is mainly composed of $Fe_5C_2$, and which exhibit a smaller corrosion resistance (%) than the iron carbide fine particles obtained in step (b).

4. A process as defined in claim 3 wherein the contact step (b) is conducted at a temperature of 300°-395° C.

* * * * *

UNITED STATES PATENT AND TRADEMARK OFFICE
CERTIFICATE OF CORRECTION

PATENT NO. : 5,104,561
DATED      : April 14, 1992
INVENTOR(S) : Ikuo KITAMURA et al It is certified that error appears in the above-identified patent and that said Letters Patent is hereby corrected as shown below:

On the cover page, in Item [54], after "PREPARING" insert -- IRON --.

Signed and Sealed this

Sixth Day of July, 1993

Attest:

MICHAEL K. KIRK

Attesting Officer

Acting Commissioner of Patents and Trademarks